United States Patent
Lee

(10) Patent No.: US 11,150,819 B2
(45) Date of Patent: Oct. 19, 2021

(54) CONTROLLER FOR ALLOCATING MEMORY BLOCKS, OPERATION METHOD OF THE CONTROLLER, AND MEMORY SYSTEM INCLUDING THE CONTROLLER

(71) Applicant: SK hynix Inc., Icheon-si (KR)

(72) Inventor: Jong-Min Lee, Seoul (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/730,579

(22) Filed: Dec. 30, 2019

(65) Prior Publication Data

US 2020/0363965 A1 Nov. 19, 2020

(30) Foreign Application Priority Data

May 17, 2019 (KR) .......................... 10-2019-0058121

(51) Int. Cl.
*G06F 3/06* (2006.01)

(52) U.S. Cl.
CPC .......... *G06F 3/0631* (2013.01); *G06F 3/0604* (2013.01); *G06F 3/064* (2013.01); *G06F 3/0652* (2013.01); *G06F 3/0659* (2013.01); *G06F 3/0673* (2013.01)

(58) Field of Classification Search
CPC ...... G06F 3/0631; G06F 3/0604; G06F 3/064; G06F 3/0652; G06F 3/0659; G06F 3/0673; G06F 3/0614
See application file for complete search history.

(56) References Cited

U.S. PATENT DOCUMENTS

| 9,646,721 | B1 * | 5/2017 | Michaud | G11C 16/20 |
| 10,712,954 | B2 * | 7/2020 | Kim | G11C 16/10 |
| 2010/0161937 | A1 * | 6/2010 | Tanaka | G06F 12/0246 711/209 |
| 2014/0101379 | A1 * | 4/2014 | Tomlin | G06F 12/0246 711/103 |
| 2018/0232314 | A1 * | 8/2018 | Lin | G06F 3/0679 |

FOREIGN PATENT DOCUMENTS

| KR | 10-1280181 | 7/2013 |
| KR | 10-2016-0122330 | 10/2016 |

* cited by examiner

*Primary Examiner* — Idriss N Alrobaye
*Assistant Examiner* — Richard B Franklin
(74) *Attorney, Agent, or Firm* — Perkins Coie LLP

(57) ABSTRACT

A memory system includes a memory device including a plurality of memory blocks, and a controller in communication with the memory device to control an operation of the memory device, the controller allocating, among the plurality of memory blocks, a normal region and a redundancy region. The controller divides the normal region into a user region for storing user data, a user overprovisioning region for user data management, a map region for storing map data, and a map overprovisioning region for map data management, and divides the redundancy region into a reserved region and an additional map overprovisioning region, and wherein the reserved region, upon determination that a block in the normal region is a bad block, replaces the bad block.

20 Claims, 8 Drawing Sheets

| USER_BLOCK1 |
| USER_BLOCK2 |
| USER_BLOCK3 |
| USER_BLOCK4 |
| USER_BLOCK5 |
| USER_BLOCK6 |
| USER_OP_BLOCK1 |
| USER_OP_BLOCK2 |
| MAP_BLOCK1 |
| MAP_BLOCK2 |
| MAP_BLOCK3 |
| MAP_OP_BLOCK1 |
| MAP_OP_BLOCK2 |
| MAP_OP_BLOCK3 |
| MAP_OP_BLOCK4 |
| MAP_OP_BLOCK5 |
| RSV_BAD_BLOCK1 |
| RSV_BAD_BLOCK2 |
| RSV_BAD_BLOCK3 |
| RSV_BAD_BLOCK4 |

| USER_BLOCK1 |
| USER_BLOCK2 |
| USER_BLOCK3 |
| USER_BLOCK4 |
| USER_BLOCK5 |
| BAD_BLOCK |
| USER_OP_BLOCK1 |
| USER_OP_BLOCK2 |
| MAP_BLOCK1 |
| MAP_BLOCK2 |
| MAP_BLOCK3 |
| MAP_OP_BLOCK1 |
| MAP_OP_BLOCK2 |
| MAP_OP_BLOCK3 |
| MAP_OP_BLOCK4 |
| RSV_BAD_BLOCK1 |
| USER_BLOCK6 |
| RSV_BAD_BLOCK2 |
| RSV_BAD_BLOCK3 |
| RSV_BAD_BLOCK4 |

| USER_BLOCK1 |
| BAD_BLOCK |
| USER_BLOCK3 |
| BAD_BLOCK |
| USER_BLOCK5 |
| BAD_BLOCK |
| BAD_BLOCK |
| USER_OP_BLOCK2 |
| MAP_BLOCK1 |
| BAD_BLOCK |
| MAP_BLOCK3 |
| MAP_OP_BLOCK1 |
| USER_OP_BLOCK1 |
| USER_BLOCK4 |
| USER_BLOCK2 |
| MAP_BLOCK2 |
| USER_BLOCK6 |
| RSV_BAD_BLOCK2 |
| RSV_BAD_BLOCK3 |
| RSV_BAD_BLOCK4 |

FIG. 6

| BLOCK | BAD | MAP_OP_ADD | RSV_BAD | 146 |
|---|---|---|---|---|
| 1 | 0 | 0 | 0 | |
| 2 | 1 | 0 | 0 | |
| 3 | 0 | 0 | 0 | |
| 4 | 1 | 0 | 0 | |
| ... | ... | ... | ... | |
| 19 | 0 | 0 | 1 | |
| 20 | 0 | 0 | 1 | |
| TOTAL | 5 | 1 | 3 | |

CONTROLLER FOR ALLOCATING MEMORY BLOCKS, OPERATION METHOD OF THE CONTROLLER, AND MEMORY SYSTEM INCLUDING THE CONTROLLER

CROSS-REFERENCE TO RELATED APPLICATION

This patent document claims the priority and benefits of Korean Patent Application No. 10-2019-0058121 filed on May 17, 2019, which is incorporated herein by reference in its entirety.

TECHNICAL FIELD

The embodiments of the disclosed technology generally relate to a memory system.

BACKGROUND

The computer environment paradigm has shifted to cloud computing and is progressing toward ubiquitous computing in which computing is made to appear anytime and everywhere.

In contrast to desktop computing, ubiquitous computing can occur in any location using any device including portable electronic devices such as mobile phones, digital cameras, and notebook computers. In general, such portable electronic devices use one or more data storage devices as a main memory device or an auxiliary memory device of the portable electronic devices.

Data storage devices using nonvolatile memory devices provides advantages over the traditional hard disk drives in that there is no mechanical moving part, and nonvolatile memory devices offer excellent stability and durability, high data rate, and low power consumption. Data storage devices having such advantages include a universal serial bus (USB) memory device, memory cards having various interfaces, and a solid state drive (SSD).

SUMMARY

The embodiments of the disclosed technology relate to a memory system that can improve its performance by utilizing at least a part of a redundancy region of a memory device.

Memory systems implemented based on the embodiments of the disclosed technology can improve their performance and reliability regardless of their lifespan.

The disclosure provides a memory system, a controller and an operation method of the controller.

In some embodiments of the disclosed technology, a memory system may include: a memory device including a plurality of memory blocks; and a controller suitable for controlling an operation of the memory device, and allocating the plurality of memory blocks to a normal region and a redundancy region, wherein the controller manages the plurality of memory blocks by dividing the normal region into a user region in which user data is stored, a user overprovisioning region for user data management, a map region in which map data is stored and a map overprovisioning region for map data management, and dividing the redundancy region into a reserved region for replacing, each time a bad block occurs among memory blocks allocated to the normal region, the occurred bad block and an additional map overprovisioning region.

In some embodiments of the disclosed technology, a controller suitable for controlling a memory device including a plurality of memory blocks may include: a map manager suitable for performing mapping between a logical address and a physical address; and a block manager suitable for allocating memory blocks a number of which corresponds to a difference between a total number of the plurality of memory blocks and a maximum number of bad blocks, as a normal region, allocating memory blocks a number of which corresponds to a difference between the maximum number of bad blocks and an initial number of bad blocks, as a redundancy region, and managing the plurality of memory blocks by dividing the normal region into a user region in which user data is stored, a user overprovisioning region for user data management, a map region in which map data is stored and a map overprovisioning region for map data management, and dividing the redundancy region into a reserved region for replacing, each time a bad block occurs among memory blocks allocated to the normal region, the occurred bad block and an additional map overprovisioning region.

In some embodiments of the disclosed technology, a method for operating a controller suitable for controlling a memory device including a plurality of memory blocks may include: allocating memory blocks a number of which corresponds to a difference between a total number of the plurality of memory blocks and a maximum number of bad blocks, as a normal region, and allocating memory blocks a number of which corresponds to a difference between the maximum number of bad blocks and an initial number of bad blocks, as a redundancy region; dividing the normal region into a user region in which user data is stored, a user overprovisioning region for user data management, a map region in which map data is stored and a map overprovisioning region for map data management; and dividing the redundancy region into a reserved region for replacing, each time a bad block occurs among memory blocks allocated to the normal region, the occurred bad block and an additional map overprovisioning region.

In some embodiments of the disclosed technology, a memory system includes a memory device including a plurality of memory blocks, and a controller in communication with the memory device to control an operation of the memory device, the controller allocating, among the plurality of memory blocks, a normal region and a redundancy region. The controller divides the normal region into a user region for storing user data, a user overprovisioning region for user data management, a map region for storing map data, and a map overprovisioning region for map data management, and divides the redundancy region into a reserved region and an additional map overprovisioning region, and wherein the reserved region, upon determination that a block in the normal region is a bad block, replaces the bad block.

In some embodiments of the disclosed technology, a controller for controlling a memory device including a plurality of memory blocks includes a map manager to perform mapping between a logical address and a physical address, a block manager to allocate a normal region and a redundancy region, the normal region including memory blocks a number of which corresponds to a difference between a total number of the plurality of memory blocks and a maximum acceptable number of bad blocks, the redundancy region including memory blocks a number of which corresponds to a difference between the maximum acceptable number of bad blocks and an initial number of bad blocks that exist from an initial operation of the memory device, the block manager dividing the normal region into a user region for storing user data, a user overprovisioning region for user data management, a map region for storing map data and a map overprovisioning region for map data management, and dividing the redundancy region into a reserved region and an additional map overprovisioning region, wherein the reserved region, upon determination that a block in the normal region is a bad block, replaces the bad block.

In some embodiments of the disclosed technology, a method for controlling a memory device including a plurality of memory blocks includes allocating a normal region and a redundancy region, the normal region including memory blocks a number of which corresponds to a difference between a total number of the plurality of memory blocks and a maximum acceptable number of bad blocks, the redundancy region including memory blocks a number of which corresponds to a difference between the maximum number of bad blocks and an initial number of bad blocks that exist from an initial operation of the memory device, dividing the normal region into a user region for storing user data, a user overprovisioning region for user data management, a map region for storing map data and a map overprovisioning region for map data management, and dividing the redundancy region into a reserved region and an additional map overprovisioning region, wherein the reserved region, upon determination that a block in the normal region is a bad block, replaces the bad block.

In some embodiments of the disclosed technology, a controller may use at least a part of a redundancy region of a memory device as a map overprovisioning region for storing map data. If a memory space for storing map data is sufficient, a frequency of an erase operation for securing a memory space may be reduced. Therefore, the performance of a memory system including the controller and the memory device may be improved.

In some embodiments of the disclosed technology, the controller may allocate a remaining part of the redundancy region of the memory device as a reserved region for replacement of a bad block. The controller may flexibly adjust the size of a map overprovisioning region so that the size of the reserved region does not decrease due to replacement of a bad block. Therefore, the performance and reliability of the memory system may be ensured even in the case where the memory device is aged.

Effects obtainable from the disclosure may be non-limited by the above-mentioned effect. Other unmentioned effects may be clearly understood from the following description by those having ordinary skill in the technical field to which the disclosure pertains.

BRIEF DESCRIPTION OF THE DRAWINGS

FIGS. 5A to 5C are diagrams illustrating an example of the memory device based on some embodiments of the disclosed technology.

FIG. 6 is a diagram illustrating an example of a block management information included in the memory system based on some embodiments of the disclosed technology.

DETAILED DESCRIPTION

The technology disclosed in this patent document can be implemented in some embodiments to provide memory systems and methods that, among other features and benefits, effectively utilize memory resources.

Figure 1:
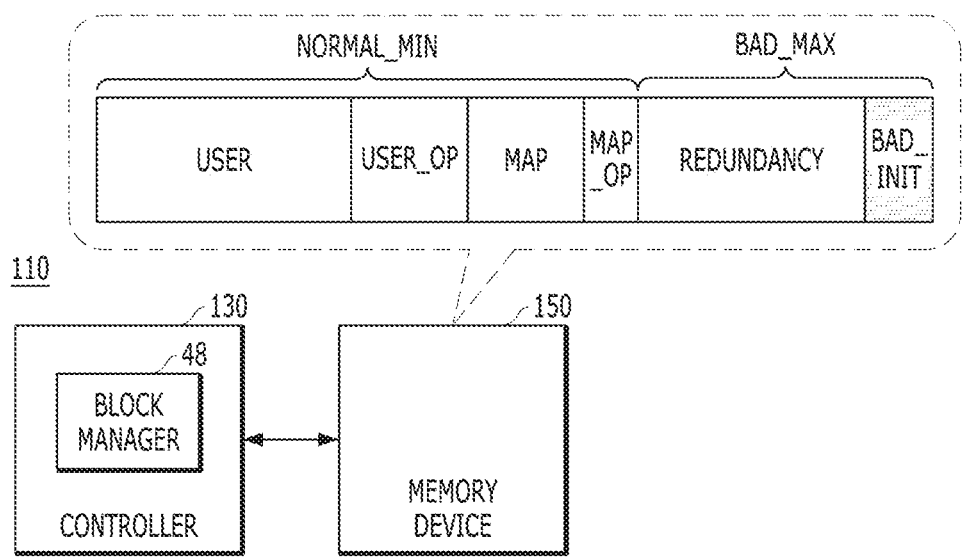
FIG. 1 is a representation of an example memory system based on an embodiment of the disclosed technology.

FIG. 1 is a representation of an example memory system 110 based on an embodiment of the disclosed technology.

In some implementations, the memory system 110 may include a memory device 150 and a controller 130 which controls the operations of the memory device 150.

The memory device 150 may include a plurality of nonvolatile memory cells. In some implementations, the plurality of nonvolatile memory cells may include NAND flash memory cells arranged in a plurality of memory strings. A set of memory cells arranged in the memory strings is referred to as a memory cell array. The set of memory cells included in a memory cell array of the memory device 150 may be grouped into a plurality of memory blocks. Each memory block may include a plurality of pages. Each page may include a set of memory cells that share a word line. In some implementations, the memory device 150 may perform an erase operation on a memory block basis, and may perform read and write operations on a page basis. In some implementations where the memory cells are flash memory cells, the memory device 150 performs an erase operation before a write operation, contrary to conventional file systems that allow overwrite operations. File systems that create and remove files often reuse memory blocks by overwriting a memory block with new contents. Flash-based memory devices cannot overwrite a block of storage without erasing it first.

In order to fill the gap between the conventional file systems and such flash-based memory devices, the controller 130 may include a flash translation layer (FTL) for efficiently managing the operations of the memory device 150. FIG. 1 illustrates a block manager 48 which may be included in the FTL.

Figure 2:
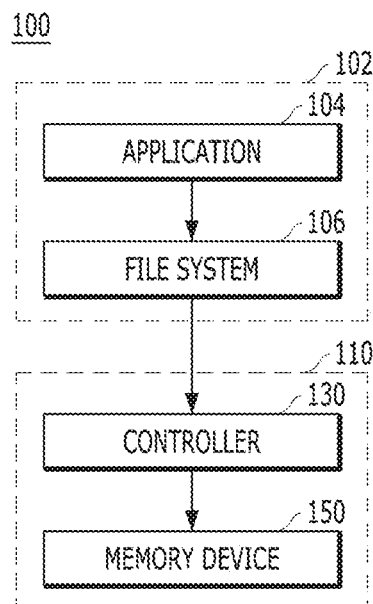
FIG. 2 is a diagram illustrating an example of the hierarchical structure of a data processing system including the memory system.

FIG. 2 is a diagram illustrating an example of the hierarchical structure of a data processing system 100 including the memory system 110. In some implementations, the data processing system 100 may include a host 102 and the memory system 110.

The host 102 may include, for example, portable electronic devices such as a mobile phone, an MP3 player and a laptop computer or electronic devices such as a desktop computer, a game player, a TV and a projector. The host 102 may include an application 104 and a file system 106. The memory system 110 may be used as a main memory device or an auxiliary memory device of the host 102.

The data processing system 100 may have a hierarchical structure in the order of the application 104, the file system 106, the controller 130 and the memory device 150.

The controller 130 may receive a logical address from the application 104 or the file system 106. The controller 130 may receive a logical address, and may translate the logical address into a physical address, which is used to select desired physical memory cells in the memory device 150. The controller 130 may have a mapping table which is used to map logical addresses to physical addresses.

As shown in FIG. 1, the memory device 150 may include defective memory blocks. In one example, the block manager 48 may determine whether a certain memory block has defective memory cells that can cause data corruption or other failure. Such a memory block can be referred to as a bad block, and may control the controller 130 not to access the bad block.

In some implementations, such as bad block may include an initial bad block BAD_NIT, which exists from an initial operation of the memory system 110. In some implementations, the memory system 110 may set a minimum required number for normal blocks NORMAL_MIN to be secured before starting operating the memory device 150. Likewise, the memory system 110 may set a maximum number of bad blocks BAD_MAX the memory system 110 can accept. In the case where the memory device 150 has an initial number of bad blocks larger than the maximum acceptable number of bad blocks, the memory device 150 may be regarded as failed, and thus may not be used in the memory system 110. Thus, an initial number of bad blocks of the memory device 150 included in the memory system 110 is smaller than a maximum number of bad blocks unless it is determined unusable.

The block manager 48 may allocate, among a plurality of memory blocks of the memory device 150, a normal region accessible to the user and set aside a redundancy region. The block manager 48 may regard a memory region as the normal region if it includes at least the minimum number of normal blocks. The block manger 48 may divide memory blocks of the normal region into multiple regions and allocate a user region USER, a user overprovisioning region USER_OP, a map region MAP, and a map overprovisioning region MAP_OP. Overprovisioning regions are memory spaces that are reserved for performing various memory management functions such as garbage collection function. In some implementations, over-provisioning may be used by the garbage collection function as a temporary workspace to manage valid page merges and reclaim blocks filled with invalid pages. The controller 130 may control the memory device 150 to store user data in the user region USER and store map data in the map region MAP. The controller 130 may use the user overprovisioning region USER_OP to manage user data, and may use the map overprovisioning region MAP_OP to manage map data. For example, by using the user overprovisioning region USER_OP, the controller 130 may perform a garbage collection operation when the memory device 150 lacks the user region to store user data.

In some implementations, normal blocks that are allocated to be used as the user region and the map region may be reserved as redundancy blocks. In some implementations, the number of redundancy blocks may be determined based on a difference between the maximum number of bad blocks the memory system 150 can accept and the initial number of bad blocks of the memory system 150. FIG. 1 illustrates examples of a user region, a user overprovisioning region, a map region, a map overprovisioning region, a redundancy region and an initial bad region, which constitute a plurality of memory blocks. FIG. 1 illustrates ratios of the regions in the memory device. It is to be noted that each of the regions may be distributed among different memory blocks.

A bad block may occur due to various reasons such as disturbance and wear-out issues during the operation of the memory system 110. When a bad block occurs in the user region or the map region during the operation of the memory system 110, the block manager 48 may replace the corresponding bad block with a new memory block of the redundancy region. In order to avoid losing data stored in the bad block, the controller 130 may read the data stored in the bad block and write it to the new memory block. The controller 130 may also update the address mapping information associated with the bad block to the new memory block such that the logical address of the bad block is mapped to the physical address of the new block. The controller 130 may reflect the updated address mapping information to a mapping table in the memory system 110. Upon receipt of an access request from the outside, the controller 130 may provide, to the memory device 150, physical block addresses, excluding physical addresses of bad blocks, based on logical block address associated with the access request by referring to the mapping table.

In one example, memory blocks of the redundancy region remain unused until they replace bad blocks during the operation of the memory system 110. In some embodiments of the disclosed technology, however, those memory blocks of the redundancy region can be effectively utilized during the operation of the memory system 110.

The controller 130 of the memory system 110 based on some embodiments of the disclosed technology may utilize a part of the redundancy region of the memory device 150 as a reserved region for replacing bad blocks, and may utilize a remaining part of the redundancy region of the memory device 150 as an additional map overprovisioning region. By utilizing empty blocks of the redundancy region as the additional map overprovisioning region, it is possible to effectively secure additional memory spaces for storing map data, thereby improving the performance of the memory system 110.

Figure 3:
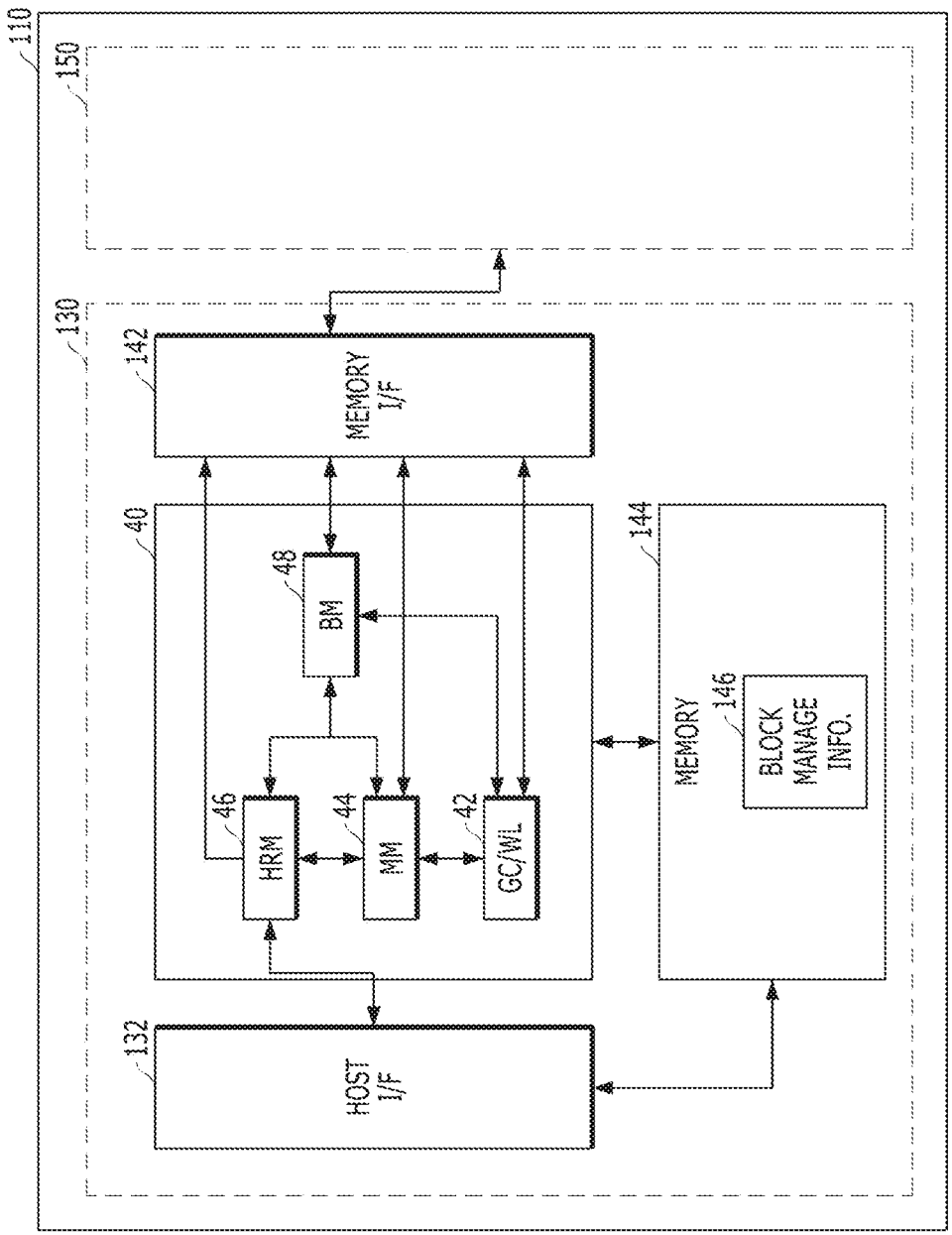
FIG. 3 is a diagram illustrating an example of the memory system based on some embodiments of the disclosed technology.

FIG. 3 is a diagram illustrating an example of the memory system 110 based on some embodiments of the disclosed technology.

As described above with reference to FIG. 1, the memory system 110 may include the controller 130 and the memory device 150. The controller 130 may include a host interface 132, an FTL 40, a memory interface 142 and a memory 144, which are in communication with each other.

The host interface 132 is used to enable a host to communicate with the memory system 110. Commands and data of the host 102 can move through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), integrated drive electronics (IDE) and MIPI (mobile industry processor interface).

The memory interface 142 may is used to enable the controller 130 to communicate with the memory device 150 and to allow the controller 130 to control operations of the memory device 150 in response to a request from the host 102. In the case where the memory device 150 is a flash memory such as a NAND flash memory, the memory interface 142 may include the FTL 40 to generate a control signal for the memory device 150 interface the data transmission between the controller 130 and the memory device 150 and between the host 102 and the memory system 110. The memory interface 142 may operate as an interface for processing a command and data that are communicated between the controller 130 and the memory device 150, and may include a NAND flash interface.

In some implementations, the FTL 40 controls how data is stored and retrieved to and from the memory system 110. Hard disk drives have been key storage devices, and thus file systems for hard disk drives are being used as general-purpose file systems. Memory systems having flash memory devices can utilize such general-purpose file systems, but they are suboptimal for several reasons, such as erasing blocks and wear leveling. As discussed above, flash memory blocks need to be erased before they can be written to, and thus the memory systems having flash memory devices need to have information associated with erasing blocks, which hard disk drives do not need. Therefore, the FTL 40 is used between the general-purpose file system and the flash memory.

In some implementations, the FTL 40 may include a host request manager 46 which maintains a host request received from the host interface 132, a map manager 44 which maintains map data, a status manager 42 which performs garbage collection or wear leveling, and a block manager 48 which maintains information regarding the status of memory blocks and executes instructions with respect to memory blocks in the memory device 150.

For example, the host request manager 46 may process a read request, a write request and an event request received from the host interface 132, by using the map manager 44 and the block manager 48. The host request manager 46 may provide a search request to the map manager 44 to obtain a physical address corresponding to a logical address of a transferred request, and may process a read request by providing a read command to the memory interface 142 for the physical address. In some implementations, the host request manager 46 may first provide a write request to the block manager 48 and thereby write data in an empty (erased) page of the memory device 150, and then may provide a map update request to the map manager 44 to update a mapping information between a logical address and a physical address.

The block manager 48 may translate a write request of the host request manager 46, the map manager 44 and the status manager 42, into a write command for the memory device 150.

In order to maximize the write performance of the memory system 110, the block manager 48 may collect write requests, and may provide a flash write command for multi-plane and one-shot program operations, to the memory interface 142. Also, in order to maximize parallel processing of a multi-channel and multi-direction flash controller, various flash write commands may be provided to the memory interface 142.

In the case where an additional block is needed, the block manager 48 may select and erase a block that does not include any valid data, and, in the case where garbage collection is required, the block manager 48 may select blocks that include valid pages to perform garbage collection. In order to allow the block manager 48 to secure additional empty blocks, the status manager 42 may perform garbage collection operations, including: collecting valid data from selected memory blocks; migrating the valid data to available blocks; and erasing the selected blocks. If the block manager 48 provides information on the selected block to be erased, to the status manager 42, the status manager 42 may first check all pages of the selected block and check whether each page is valid or not. For example, in order to determine the validity of each page, the status manager 42 may identify a logical address recorded in an out-of-band (OOB) region of each page, and may compare an actual address of the page with an actual address mapped to a logical address obtained from a search request of the map manager 44. The status manager 42 may provide a program command for each valid page, to the block manager 48. If a program operation is completed, the map manager 44 may update a mapping table.

In some embodiments of the disclosed technology, the block manager 48 may inhibit an access to a bad block, may divide normal memory blocks into a plurality of regions, and may control the memory device 150 to store different data in the regions. The operation of the block manager 48 based on some embodiment of the disclosed technology will be described below in detail with reference to FIGS. 4A to 7.

The map manager 44 may manage the mapping table between logical addresses and physical addresses, and may process requests such as a search request and an update request generated by the host request manager 46 and the status manager 42. The map manager 44 may store the entire map data in the map region of the memory device 150, and may cache at least a part of the map data depending on the capacity of the memory 144. If a map cache miss occurs while processing search and update commands, the map manager 44 may provide a read command to the memory interface 142 and thereby load map data stored in the memory device 150. If an amount of data cached in the memory 144 exceeds a threshold value, the map manager 44 may provide a write command to the block manager 48 and thereby store map data cached in the memory 144, in the memory device 150.

In the case where garbage collection is performed, while the status manager 42 is copying a valid page, the host request manager 46 may write the latest version of data for the same logical address of the page and may simultaneously provide an update request. If the status manager 42 requests map data update in a state in which copy of a valid page is incomplete, the map manager 44 may not perform mapping table update. The map manager 44 may perform map update only in the case where the latest map table still indicates a previous actual address, thereby ensuring accuracy.

The memory 144 may be used as a working memory of the memory system 110 and the controller 130, and may store data for operating the memory system 110 and the controller 130.

For example, the memory 144 may store data necessary to perform data input/output operations between the host 102 and the memory device 150. Further, the memory 144 may store a block management information 146 including attribute information of respective memory blocks.

In some embodiments of the disclosed technology, the memory device 150 may include a nonvolatile memory such as a NAND flash memory. In some implementations, the memory device 150 may include a phase change memory (PCRAM: phase change random access memory), a resistive memory (RRAM (ReRAM): resistive random access memory), a ferroelectric memory (FRAM: ferroelectric random access memory) or a spin transfer torque magnetic memory (STT-RAM or STT-MRAM: spin transfer torque magnetic random access memory).

The memory device 150 may include a plurality of memory blocks including single level cell (SLC) memory blocks for storing one-bit of data per cell and multi-level cell (MLC) memory blocks for storing more than one bit of data per cell. Each of the SLC memory blocks may include a plurality of pages including memory cells for storing one-bit data. The SLC memory blocks may ensure fast performance with high data reliability. On the other hand, each of the MLC memory blocks may include a plurality of pages including memory cells for storing two or more bits of data per cell.

The memory device 150 may be realized as a two-dimensional or three-dimensional memory device. Each memory block included in the memory device 150 may include a plurality of NAND memory cell strings arranged in a second direction. The plurality of NAND memory cell strings may be arranged in a first direction and a third direction. Each NAND memory cell string may be coupled to a bit line, at least one string select line, at least one ground select line, a plurality of word lines, at least one dummy word line and a common source line, and may include a plurality of transistor structures.

Figure 4A:
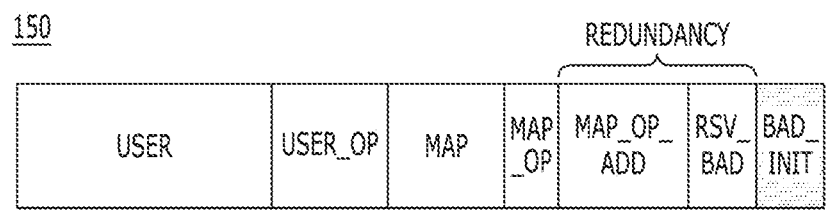
FIGS. 4A and 4B are diagrams schematically illustrating an example of a memory device based on some embodiments of the disclosed technology.
Figure 4B:
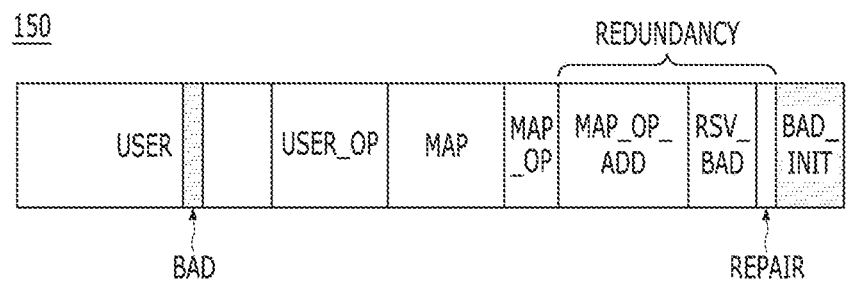

FIGS. 4A and 4B are diagrams schematically an example of the memory device 150 based on some embodiments of the disclosed technology. Specifically, FIG. 4A illustrates respective regions including memory blocks of the memory device 150, and FIG. 4B illustrates an example of using the redundancy region when a bad block occurs in the memory device 150.

Referring to FIG. 4A, the memory blocks included in the memory device 150 may include a user region USER, a user overprovisioning region USER_OP, a map region MAP, a map overprovisioning region MAP_OP and a redundancy region REDUNDANCY. The redundancy region REDUNDANCY of the memory device 150 may include an additional map overprovisioning region MAP_OP ADD and a reserved region RSV_BAD. In the context of this patent document, memory blocks that includes the respective regions will be referred to as user blocks, user overprovisioning blocks, map blocks, map overprovisioning blocks, additional map overprovisioning blocks, and reserved blocks. Both the map overprovisioning blocks of the normal region and the additional map overprovisioning blocks of the redundancy region as map overprovisioning blocks may be used to manage map data. The block manager 48 may allocate a predetermined number of memory blocks among redundancy blocks as the reserved blocks, and may allocate remaining blocks as the additional map overprovisioning blocks.

Referring to FIG. 4A, similarly to user data, map data may also be stored in the memory device 150. Since the memory device 150 does not support an overwrite operation, in order to update map data, the memory device 150 may invalidate existing map data and write updated map data in another memory block of the map region. If the size of an invalidated map region increases, the efficiency of the memory system 110 decreases. Therefore, the controller 130 may secure a storage space of the map region by performing a garbage collection operation for map data.

The garbage collection operation may involve a read operation for valid data, a write operation for the read valid data and an erase operation. As the size of an overprovisioning region is large, a marginal space of a memory device may increase and thus garbage collection performance may be improved, and the necessity to secure a marginal space of the memory device may decrease and thus the frequency of performing a garbage collection operation may be reduced. Therefore, the increase in the size of an overprovisioning region results in performance improvement.

The amount of map data is usually smaller than the amount of user data. Likewise, the number of memory blocks constituting the map overprovisioning region may be smaller than the number of memory blocks constituting the user overprovisioning region. Therefore, using memory blocks of the redundancy region as the map overprovisioning region is more cost effective than the memory blocks of the redundancy region as the user overprovisioning region. Therefore, in some embodiments of the disclosed technology, memory blocks of the redundancy region are used in addition to the map overprovisioning region, and thus the frequency of performing a garbage collection operation may further decrease compared to when the memory blocks of the redundancy region are used in addition to the user overprovisioning region. In other words, by using at least some memory blocks of the redundancy region as additional map overprovisioning blocks, the frequency of performing a garbage collection operation may be significantly reduced, resulting in performance improvement of the memory system 110.

Referring to FIG. 4B, during the operation of the memory system 110, a bad block may occur among the memory blocks of the normal region of the memory device 150 of FIG. 4A. FIG. 4B illustrates a bad block BAD which has occurred in the user region. The block manager 48 may replace the bad block with a memory block included in the reserved region. FIG. 4B also illustrates a replaced memory block REPAIR.

If the number of reserved blocks decreases due to the replaced memory block, the block manager 48 may change an additional map overprovisioning block in an erased state to a reserved region, to compensate for the decrease in the number of reserved blocks.

For instance, in order to secure enough usable normal blocks regardless of the occurrence of bad blocks and maintain the memory capacity and performance, the block manager 48 may replace the bad blocks with the same number of reserved blocks. The block manager 48 may change the same number of additional map overprovisioning blocks as the number of replaced reversed blocks, to the reserved region.

In some implementations, in the case where all additional map overprovisioning blocks are changed to reserved blocks, the block manager 48 may not supplement the reversed block even though the number of reserved blocks decreases.

FIGS. 5A to 5C are diagrams illustrating an example of the memory device 150 based on some embodiments of the disclosed technology. The operation of the block manager 48 based on some embodiments of the disclosed technology will be described below in detail with reference to FIGS. 5A to 5C. By way of example, FIGS. 5A to 5C illustrate states of the memory device 150 according to the operation of the memory system 110 in chronological order. FIGS. 5A to 5C illustrate a case where, in the memory device 150, the normal region includes 12 memory blocks and the redundancy region includes eight memory blocks. In FIGS. 5A to 5C, initial bad blocks are omitted.

FIG. 5A illustrates a case where the memory device 150 includes six user blocks USER_BLOCK1 to USER_BLOCK6, two user overprovisioning blocks USER_OP_BLOCK1 and USER_OP_BLOCK2, three map blocks MAP_BLOCK1 to MAP_BLOCK3, one map overprovisioning block MAP_OP_BLOCK1, four additional map overprovisioning blocks MAP_OP_BLOCK2 to MAP_OP_BLOCKS, and fourth reserved blocks RSV_BAD_BLOCK1 to RSV_BAD_BLOCK4.

FIG. 5B illustrates a case where a bad block occurs in the memory device 150 of FIG. 5A during the operation of the memory system 110. If the number of defects occurred in the sixth user block USER_BLOCK6 is equal to or larger than a reference value, the block manager 48 may determine that the sixth user block USER_BLOCK6 is a bad block, and may replace the bad block with the first reserved block RSV_BAD_BLOCK1. The block manager 48 may determine that the fifth map overprovisioning block MAP_OP_

BLOCKS is the first reserved block RSV_BAD_BLOCK1, thereby maintaining the number of reserved blocks.

FIG. 5C illustrates a case where bad blocks additionally occur in the memory device 150 of FIG. 5B. If additional defects occur in the second user block USER_BLOCK2, the fourth user block USER_BLOCK4, the first user overprovisioning block USER_OP_BLOCK1 and the second map block MAP_BLOCK2, the respective bad blocks may be replaced with reserved blocks. As map overprovisioning blocks are changed to reserved blocks, all map overprovisioning blocks may be used in replacing bad blocks. In the case where all map overprovisioning blocks are used in replacing bad blocks, the block manager 48 may not maintain any more the number of reserved blocks.

FIG. 6 is a diagram illustrating an example of the block management information 146 included in the memory system 110 based on some embodiment of the disclosed technology.

Referring to FIG. 6, the block management information 146 may be stored in the memory 144 in a table format. The block management information 146 may include an identifier BLOCK of each block as an index. The block management information 146 may include fields indicating whether each block is a bad block BAD, whether each block is an additional map overprovisioning block MAP_OP_ADD and whether each block is a reserved block RSV_BAD. The block management information 146 may further include information on the total number of bad blocks, the number of additional map overprovisioning blocks and the number of reserved blocks. The block manager 48 may control the number of reserved blocks to be maintained, based on the block management information 146, until all map overprovisioning blocks are changed to reserved blocks.

Figure 7:
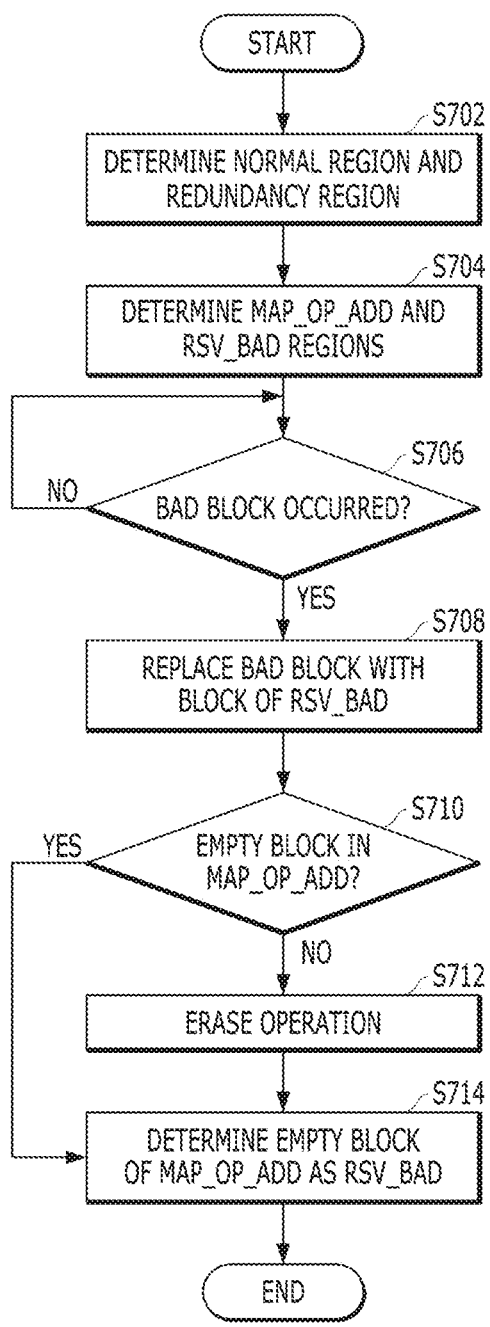
FIG. 7 is a representation of an example method for operating a memory system based on some embodiments of the disclosed technology.

FIG. 7 is a representation of an example method for operating the memory system 110 based on some embodiments of the disclosed technology.

In an initial operation of the memory system 110, at step S702, the block manager 48 may determine a normal region and a redundancy region of the memory device 150. The normal region may include user blocks, user overprovisioning blocks, map blocks and map overprovisioning blocks. The block manager 48 may use memory blocks the number of which corresponds to a difference between a maximum number of bad blocks and an initial number of bad blocks, among a plurality of memory blocks, as the redundancy region.

At step S704, the block manager 48 may divide the redundancy region into additional map overprovisioning blocks and reserved blocks. In one embodiment, the block manager 48 may determine a predetermined number of blocks among redundancy blocks as the reserved blocks, and may determine remaining blocks as the additional map overprovisioning blocks. The block manager 48 may store information indicating which blocks among the plurality of memory blocks are bad blocks, reserved blocks and additional map overprovisioning blocks, respectively, by updating the block management information 146.

At step S706, the block manager 48 may detect whether a bad block occurs. According to an embodiment, the block manager 48 may detect a memory block in which a fail of a read operation or a write operation has occurred, as a bad block.

If a bad block does not occur (NO at the step S706), the block manager 48 may continuously detect whether a bad block occurs.

If a bad block occurs (YES at the step S706), at step S708, the block manager 48 may replace the bad block with a reserved block. The block manager 48 may indicate which block is a newly occurred bad block, by updating the block management information 146.

The block manager 48 may perform mapping between a logical address of data stored in the occurred bad block and a physical address of the reserved block. The block manager 48 may move the data stored in the occurred bad block, to the reserved block, and may store the data in the reserved block. The map manager 44 may provide a request to the block manager 48 to write map data reflecting the mapping, in the map blocks. The block manager 48 may perform a garbage collection operation for map data, by using a map overprovisioning region of the normal region and an additional map overprovisioning region of the redundancy region, to manage map data.

At step S710, the block manager 48 may determine whether an empty block exists in the additional map overprovisioning region.

If an empty block exists in the additional map overprovisioning region (YES at the step S710), at step S714, the block manager 48 may determine an empty block of the additional map overprovisioning region as a reserved block. The block manager 48 may update the block management information 146.

If an empty block does not exist in the additional map overprovisioning region (NO at the step S710), at step S712, the status manager 42 may generate an empty block of the additional map overprovisioning region by controlling an erase operation for an additional map overprovisioning block in which valid data is not stored. At the step S714, the block manager 48 may determine an empty block which is generated by the garbage collection operation, as a reserved block. The block manager 48 may indicate which block among additional map overprovisioning blocks is changed to a reserved block, by updating the block management information 146.

According to the embodiment of the disclosure, as the memory system 110 uses a redundancy region as an additional map overprovisioning region for managing map data, the performance of the memory system 110 may be improved. As the memory system 110 replaces a bad block occurring during the operation of the memory system 110 with any one of reserved blocks, the performance and reliability of the memory system 110 may be improved. As the memory system 110 determines an additional map overprovisioning block as a reserved block, the number of reserved blocks may be maintained.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device including a plurality of memory blocks; and
a controller in communication with the memory device to control an operation of the memory device, the controller allocating, among the plurality of memory blocks, a normal region and a redundancy region,
wherein the controller divides the normal region into a user region for storing user data, a user overprovisioning region for user data management, a map region for storing map data, and a map overprovisioning region for map data management, and divides the redundancy region into a reserved region and an additional map overprovisioning region, and wherein the reserved region, upon determination that a block in the normal region is a bad block, replaces the bad block, wherein the controller allocates the memory blocks to the redundancy region such that a number of the memory blocks allocated to the redundancy region corresponds to a difference between a maximum acceptable number of bad blocks and a number of initial bad blocks, and wherein the number of initial bad blocks of the memory device is smaller than the maximum acceptable number of bad blocks, and in case that the number of initial bad blocks of the memory device is larger than the maximum acceptable number of bad blocks, the memory device is not used.

2. The memory system according to claim 1, wherein the controller replaces the bad block with a specific memory block among memory blocks allocated to the reserved region, and changes at least one memory block among memory blocks allocated to the additional map overprovisioning region, to the reserved region.

3. The memory system according to claim 2, wherein the controller replaces the bad block such that the number of specific memory blocks that replaces the bad block is the same as the number of the bad blocks.

4. The memory system according to claim 3, wherein the controller changes the at least one memory block to the reserved region such that the number of memory blocks changed to the reserved region is the same as the number of the specific memory blocks replacing the bad block.

5. The memory system according to claim 2, wherein the controller replaces the bad block with the specific memory block, by:
mapping a logical address of data stored in the bad block to a physical address of the specific memory block replacing the bad block; and
controlling the memory device to move the data stored in the bad block to the specific memory block replacing the bad block.

6. The memory system according to claim 2, wherein the controller comprises a memory to store block management information indicating whether each of the plurality of memory blocks is a bad block and which memory block among the plurality of memory blocks is allocated to the reserved region or the additional map overprovisioning region.

7. The memory system according to claim 6, wherein the controller is configured to, upon determination that the bad block is replaced with the specific memory block and at least one memory block among the memory blocks allocated to the additional map overprovisioning region is changed to the reserved region, update the block management information on the bad block, the specific memory block and the at least one memory block among the plurality of memory blocks.

8. The memory system according to claim 1, wherein the controller is configured to, upon determination that an empty memory block does not exist among the memory blocks allocated to the additional map overprovisioning region, secure an empty memory block by controlling the memory device to perform an erase operation on a memory block with no valid data, among the memory blocks allocated to the additional map overprovisioning region.

9. The memory system according to claim 1, wherein the controller controls the memory device to perform a garbage collection operation for reclaiming memory blocks to secure memory spaces for the map data, by:
loading valid map data of a victim memory block to be reclaimed among memory blocks allocated to the map region to maintain the map data, to an internal memory;
writing the loaded map data to a target memory block among the memory blocks allocated to the map region; and
erasing the victim memory block.

10. The memory system according to claim 1, wherein the controller designates a memory block that has failed a read operation or a write operation as the bad block, among the memory blocks allocated to the normal region.

11. A controller for controlling a memory device including a plurality of memory blocks, comprising:
a map manager to perform mapping between a logical address and a physical address; and
a block manager to allocate a normal region and a redundancy region, the normal region including memory blocks a number of which corresponds to a difference between a total number of the plurality of memory blocks and a maximum acceptable number of bad blocks, the redundancy region including memory blocks a number of which corresponds to a difference between the maximum acceptable number of bad blocks and an initial number of bad blocks that exist from an initial operation of the memory device, the block manager dividing the normal region into a user region for storing user data, a user overprovisioning region for user data management, a map region for storing map data and a map overprovisioning region for map data management, and dividing the redundancy region into a reserved region and an additional map overprovisioning region, wherein the reserved region, upon determination that a block in the normal region is a bad block, replaces the bad block,
wherein the initial number of bad blocks of the memory device is smaller than the maximum acceptable number of bad blocks, and in case that the initial number of bad blocks of the memory device is larger than the maximum acceptable number of bad blocks, the memory device is not used.

12. The controller according to claim 11, wherein the block manager replaces the bad block with a specific memory block among memory blocks allocated to the reserved region, and changes at least one memory block among memory blocks allocated to the additional map overprovisioning region, to the reserved region.

13. The controller according to claim 12, wherein the block manager replaces the bad block with the specific memory block, by:
controlling the map manager to map a logical address of data stored in the occurred bad block to a physical address of the specific memory block; and
controlling the memory device to move the data stored in the occurred bad block to the specific memory block replacing the bad block.

14. The controller according to claim 12, further comprising:
a memory suitable for storing block management information indicating whether each of the plurality of memory blocks is a bad block and which memory block among the plurality of memory blocks is allocated to the reserved region or the additional map overprovisioning region.

15. The controller according to claim 14, wherein the block manager is configured to, upon determination that the bad block is replaced with the specific memory block and at least one memory block among the memory blocks allocated to the additional map overprovisioning region is changed to the reserved region, update the block management information on the bad block, the specific memory block and the at least one memory block among the plurality of memory blocks.

16. The controller according to claim 11, further comprising:
a status manager suitable for securing an empty memory block of the additional map overprovisioning region by controlling the memory device to perform an erase operation on a memory block with no valid data, among the memory blocks allocated to the additional map overprovisioning region,
wherein the block manager changes an empty memory block to a memory block of the reserved region.

17. The controller according to claim 16, wherein the status manager controls the memory device to perform a garbage collection operation for reclaiming memory blocks to secure memory spaces for the map data, by:
loading valid map data of a victim memory block to be reclaimed among memory blocks allocated to the map region to maintain the map data, to an internal memory;
writing the loaded map data to a target memory block among the memory blocks allocated to the map region; and
erasing the victim memory block.

18. The controller according to claim 11, wherein the block manager designates a memory block that has failed a read operation or a write operation, as the bad block, among the memory blocks allocated to the normal region.

19. A method for controlling a memory device including a plurality of memory blocks, the method comprising:
allocating a normal region and a redundancy region, the normal region including memory blocks a number of which corresponds to a difference between a total number of the plurality of memory blocks and a maximum acceptable number of bad blocks, the redundancy region including memory blocks a number of which corresponds to a difference between the maximum number of bad blocks and an initial number of bad blocks that exist from an initial operation of the memory device;
dividing the normal region into a user region for storing user data, a user overprovisioning region for user data management, a map region for storing map data and a map overprovisioning region for map data management; and
dividing the redundancy region into a reserved region and an additional map overprovisioning region, wherein the reserved region, upon determination that a block in the normal region is a bad block, replaces the bad block,
wherein the initial number of bad blocks of the memory device is smaller than the maximum acceptable number of bad blocks, and in case that the initial number of bad blocks of the memory device is larger than the maximum acceptable number of bad blocks, the memory device is not used.

20. The method according to claim 19, wherein the bad block is replaced with a specific memory block among memory blocks allocated to the reserved region, and at least one memory block among memory blocks allocated to the additional map overprovisioning region is changed to the reserved region.

* * * * *